US012240257B2

(12) United States Patent
Heinl

(10) Patent No.: US 12,240,257 B2
(45) Date of Patent: Mar. 4, 2025

(54) ACCESSORY DEVICE

(71) Applicant: COLOP Digital GmbH, Wels (AT)

(72) Inventor: Cedric Heinl, Neuhofen an der Krems (AT)

(73) Assignee: COLOP DIGITAL GMBH, Wels (AT)

( * ) Notice: Subject to any disclaimer, the term of this patent is extended or adjusted under 35 U.S.C. 154(b) by 0 days.

(21) Appl. No.: 17/778,778

(22) PCT Filed: Nov. 20, 2020

(86) PCT No.: PCT/AT2020/060414
§ 371 (c)(1),
(2) Date: May 20, 2022

(87) PCT Pub. No.: WO2021/097513
PCT Pub. Date: May 27, 2021

(65) Prior Publication Data
US 2022/0410586 A1 Dec. 29, 2022

(30) Foreign Application Priority Data
Nov. 22, 2019 (AT) .............................. A 50205/2019

(51) Int. Cl.
*B41J 3/36* (2006.01)
*B41J 3/39* (2006.01)
*B41J 29/02* (2006.01)

(52) U.S. Cl.
CPC . *B41J 3/36* (2013.01); *B41J 3/39* (2013.01); *B41J 29/023* (2013.01)

(58) Field of Classification Search
None
See application file for complete search history.

(56) References Cited

U.S. PATENT DOCUMENTS 3,867,883 A * 2/1975 Styers ...................... B41K 3/20 101/291
4,881,462 A * 11/1989 Vanoni ................ B65C 11/0289 101/292
(Continued)

FOREIGN PATENT DOCUMENTS

DE 201 11 008 U1 10/2001
DE 20311295 U1 10/2003
(Continued)

OTHER PUBLICATIONS

Chinese Office Action received for Chinese Application No. 2020800807688 on Feb. 11, 2023, 7 pgs.
(Continued)

*Primary Examiner* — Leslie J Evanisko
(74) *Attorney, Agent, or Firm* — Merchant & Gould P.C.

(57) ABSTRACT

An accessory device is for an electronic marking device. The accessory device has a connection device for releasably connecting to an electronic marking device, and the accessory device has a stop for limiting movement of a document transversely to a printhead of a connected electronic marking device. A deflecting mechanism deflects the document, and the stop and the deflecting mechanism are arranged on different sides of the printhead of the connected electronic marking device. An electronic marking device includes a printhead, a movement detector, and a controller. The controller is connected to the movement detector and to the printhead and is configured to actuate the printhead in order to print a document when movement of the electronic marking device over the document is detected by the movement detector. The electronic marking device has a stop for limiting movement of the document transversely to the printhead.

15 Claims, 7 Drawing Sheets

(56) References Cited

U.S. PATENT DOCUMENTS

| | | | | | |
|---|---|---|---|---|---|
| 5,028,934 | A | * | 7/1991 | Kasai | B41J 3/36 346/143 |
| 5,111,216 | A | | 5/1992 | Richardson et al. | |
| 5,308,173 | A | | 5/1994 | Amano et al. | |
| 5,394,799 | A | * | 3/1995 | Rhodes | B41L 19/00 101/474 |
| 5,829,893 | A | | 11/1998 | Kinoshita et al. | |
| 7,500,732 | B2 | | 3/2009 | James et al. | |
| 2002/0101610 | A1 | | 8/2002 | Winne | |
| 2008/0025779 | A1 | | 1/2008 | Henry | |
| 2008/0069620 | A1 | | 3/2008 | Anderson | |
| 2014/0283704 | A1 | * | 9/2014 | Pearce | B41K 3/46 101/481 |

FOREIGN PATENT DOCUMENTS

| | | | |
|---|---|---|---|
| EP | 3539787 | A1 | 9/2019 |
| KR | 20030013095 | A | 2/2003 |
| KR | 10-1570047 | B1 | 11/2015 |

OTHER PUBLICATIONS

International Search Report and Written Opinion of the International Searching Authority for International Patent Application No. PCT/AT2020/060414 mailed Feb. 10, 2021, 13 pages.

Office Action for Austrian Patent Application No. GM 50205/2019 mailed Apr. 8, 2020, 3 pages.

* cited by examiner

ACCESSORY DEVICE

This application is a National Stage Application of PCT/AT2020/060414, filed 20 Nov. 2020, which claims benefit of Application Serial No. GM 50205/2019, filed 22 Nov. 2019 in Austria and which applications are incorporated herein by reference. To the extent appropriate, a claim of priority is made to each of the above disclosed applications.

BACKGROUND OF THE INVENTION

The invention relates to an accessory device for an electronic marking device, wherein the accessory device has an attachment means for releasable attachment to an electronic marking device. The releasable attachment may be implemented, inter alia, by being received in a frame. As an example, the marking device may be configured as a hand-held electronic stamp. In general, the marking device may be a mobile electronic marking device, i.e. it may be portable and battery-powered or battery-operated. In general, the invention relates to an accessory device without a marking device.

An example of an accessory device of this type is known from U.S. Pat. No. 7,500,732 B2, which discloses a docking station for an electronic marking device. This consists of a housing which functions, inter alia, to receive the marking device, to secure it in the housing and to release it again from the housing with a freeing mechanism.

Furthermore, the invention relates to an electronic marking device with a printing head, a movement detector and a controller, wherein the controller is connected to the movement detector and to the printing head and is configured to activate the printing head to print onto a support when a movement of the electronic marking device is detected by the movement detector.

Electronic marking devices are moved over a support to be printed in order to print. This movement is detected by a sensor and, based on the analysed data from the movement detector, a controller activates the printing head in order to print the desired image onto the support. This support may, for example, be a substrate, a side of an article, a flat article, in particular paper, and the like. In this regard, the accuracy of the orientation of the print with respect to the paper, in particular in the case of relatively long prints, depends on the one hand on the electronic "stabilisation", i.e. electronic compensation by the controller for a movement transverse to the printing direction, and on the other hand on the accuracy of the user's movement of the marking device over the support. The electronic "stabilisation" can compensate for minor inaccuracies caused by the user without any problems, but it reaches its limits in the case of movements transversely to the printing direction which are larger than the distance between the outer edge of the image to be printed and the outer edge of the printing head and, in the case of curved movements, when the orientation of the marking device to the support also changes. Inaccuracies near an edge of the support, at least in the case of relatively narrow supports, for example when the height of the image to be printed is smaller than the width of the printing head, are optically particularly noticeable.

US 2008/0069620 A1 discloses an imaging device with a manually operable printer and a docking device for releasably receiving the printer. The docking device has a frame into which the printer can be inserted. A slot for receiving an article to be printed, for example an envelope, is provided in the frame and extends beneath a printing mechanism for the printer. In order to print, the article to be printed is pulled from one side to the other side in a direction through the slot along a linear scan path.

DE 201 11 008 U1 concerns a printing system with a base station and a printer unit which can be received in an appropriately shaped indentation in the base station. The base station has a slot in which an article to be printed, for example paper, can be received. In order to print, the paper is introduced into the slot in a manner such that it is arranged beneath a printing area of the printer unit.

KR 101570047 B1 discloses a portable printer which is inserted into a box-shaped guide and can be displaced along a slide means of the guide.

U.S. Pat. No. 5,829,893 concerns a printing device with a housing in which a feed mechanism for a sheet of paper and a transport mechanism for a carriage which can be moved backwards and forwards is received. A slot is provided in the housing; because of the width of the slit, its lateral margins cannot be configured as an abutment for the paper.

EP 3 539 787 A1 concerns a mobile imaging device for printing on a support, with at least one roller for moving the imaging device over the support when the support is printed.

DE 203 11 295 U1 concerns a printing device for printing single or multiple lines on articles with curved and/or fragile surfaces.

SUMMARY OF THE INVENTION

An objective of the invention is to propose an electronic marking device and an accessory device which can be attached to an electronic marking device. Both should be compact in use.

This objective is achieved on the one hand by means of an accessory device which, in accordance with the invention, has at least one abutment for limiting a displacement of a support transversely to a printing head of an attached electronic marking device and which has a deflector for deflecting the support, wherein the abutment and the deflector are arranged on different sides of the printing head of the attached electronic marking device.

On the other hand, the objective is achieved by means of an electronic marking device which, in accordance with the invention, has at least one abutment for limiting a displacement of the support transversely to the printing head.

In this regard, the term "displacement" means a (for example substantially linear) relative movement between the electronic marking device and the support. The limitation by means of the abutment occurs independently of whether the marking device is moved over the support or the support is moved under the marking device or over the marking device.

In this regard, the abutment may be mechanical, for example by means of a pin or an edge, for example an indentation or a projection.

The support can be orientated better by means of the abutment in accordance with the invention. More precisely, a border or an edge of the support can bear against the abutment and be guided along it during the printing procedure. The guidance in this case is not necessarily linear, but the relative movement between the marking device and the plane of the support has one fewer degrees of freedom because of it. In this manner, the accuracy of the orientation of the printing can be enhanced.

The accessory device may go round one side of the electronic marking device, in the manner of an arc, or completely around it. An opening or recess may be provided in the accessory device which at least corresponds to the size of the printing head of the electronic marking device and completely exposes it as well as at least one movement detector for the electronic marking device. This is so that printing when the marking device is inserted is not impeded. The accessory device may be attached to a housing of the electronic marking device, for example with a releasable click fitting. In another embodiment, an arcuate accessory device may be secured to the housing of an electronic marking device by means of a tongue-and-groove connection. In an optional embodiment, the shape of a portion of the accessory device matches the shape of at least a portion of the associated electronic marking device in order to be able to receive the latter in a fixed disposition or position. The seat serves to enable the disposition of the abutment with respect to the printing head to be fixed in a reproducible manner.

Moreover, in addition to the abutment, the accessory device has a deflector, wherein the abutment and the deflector are arranged on different sides of the printing head of the attached electronic marking device. The deflector means that the direction of the support to be printed can be changed directly on the marking device itself. As an example, the main plane of extent of the support can be deflected into another direction, for example to go back across the marking device. In this manner, it is possible to use the accessory device in a compact manner, because it is no longer necessary to keep both sides of the printing device for printing the support free. Thus, the printing device could be placed with one side against a wall in the printing direction. The support can be inserted and drawn out on the same side of the accessory device.

The disclosure in general also encompasses an accessory device without a deflector.

As an example, the deflector may be in the form of a cylinder or truncated cone, wherein the support slides along a portion of its curved surface. The deflector may also be configured as a deflecting roller which rotates during operation. In addition, it may also have an angular base section with rounded edges in order to avoid wearing away the support. The deflector may also be formed by only a portion of the curved surface of a cylinder or truncated cone. The contact surface of the deflector with the support may be smooth and not have any sharp edges. As far as possible, the support is not subjected at any point of the deflection to bending of a type which would cause a plastic change in the support to be printed.

The embodiments defined below are with respect to both an accessory device and also to an electronic marking device with an abutment. For the avoidance of repetition, the embodiments are described using the accessory device as the example.

In one embodiment, the deflector has at least one abutment which limits a transverse displacement of the support with respect to the deflector. The abutment can prevent the support from sliding off the deflector during operation of the accessory device, thereby ensuring optimal guidance.

In a further embodiment, the accessory device has at least two abutments, wherein the abutments are configured to limit a displacement of a support transversely to the printing head of an attached electronic marking device before and after deflection of the support at the deflector. In this case, the support is printed between one of the abutments and the deflector. The other abutment serves to reverse the support and therefore enables controlled guidance of the support to be printed, which in this embodiment is introduced into the accessory device on the same side as that from which it subsequently leaves. The guidance which occurs because of the two abutments of the accessory device and the deflector with abutment restricts any possible displacement transversely to the printing direction.

Optionally, the accessory device has at least two abutments for limiting a displacement of a support transversely to the printing head and which are arranged on different sides of the printing head of an attached electronic marking device. As an example, the two abutments are arranged opposite each other. An embodiment of this type has the advantage that not only is a relative displacement of the support transversely to the printing direction limited, but also a relative rotational movement between the support and marking device is limited. In this manner, the accuracy of the printing orientation can be enhanced, even in the case of long print lengths.

In accordance with a further embodiment, the abutments may be formed in through passages in the accessory device. In the embodiment with two abutments on different sides, the through passages are, for example, on different sides of the marking device, for example on opposite sides, in particular centred around the printing head (in the printing direction and transverse to the printing direction, centred on an imaginary line connecting a first through passage to the printing head and on to a second through passage). In the embodiment with the abutments on one side and the deflector on the other side, a through passage is preferably centred with the deflector around the printing head (in the printing direction and transversely to the printing direction, centred on an imaginary line connecting a first through passage to the printing head and on to the deflector).

By means of the embodiment with through passages, through which the support to be printed can be guided, up to four abutments may be employed to stabilise the subsection of the support which is being printed at a given time. In this manner, a relative movement of the support to be printed and the marking device can be further restricted. Because of the two abutments in each of the through passages, a type of guide is formed for the support to be printed. When the support abuts all of the abutments, the relative movement can be restricted to a linear movement in the printing direction.

In this regard, the through passages may have the same width, in particular a width of 10 mm to 40 mm, in particular 15 mm, 25 mm or 30 mm. This embodiment means that it is possible to optimise the centring of printing onto a support of the appropriate width and to guarantee this even for longer print lengths. In particular, an electronic marking device which is attached to an accessory device of this type can be used to print supports in the form of strips or bands without any restriction as to their length, without having to pay extra attention to the orientation of the support. The orientation of the support is dealt with by the guide which is formed by the abutments.

In one embodiment with through passages with different or identical widths, the abutments may be formed by an inner border of the through passages. In one embodiment of this type, the distance between the abutments transversely to the printing direction is limited to the width of the through passages. In the case of a support to be printed which has a width which is smaller than the smallest width of the through passages, however, a play will again occur and therefore the inaccuracy of the print will increase compared with a support which has a width which is the same as one of the through passages.

In order to at least reduce a susceptibility to inaccuracy of this type, in an optional embodiment, the abutments may be formed by the inner border of adapters which are respectively received in the through passages. In this manner, the separation of the abutments on each side can be adapted to the width of the support to be printed by means of suitable adapters. In this manner, any possible play of the support in the guide produced by the abutments can be avoided or at least reduced.

In one possible embodiment, the adapters can be introduced into the through passages in a releasable manner. This has the advantage that a plurality of adapters may be used for different widths of the support to be printed. This provides for great flexibility as regards the width of the support to be printed (at the same time, correct choice of the adapter can greatly reduce the susceptibility of the actual printing to inaccuracy).

In a further possible embodiment, the adapters are pivotably mounted with respect to the through passages. In this regard, they may be securely attached to the accessory device by their pivotal axis or, for example, they may be releasabiy attached to the pivotal axis by means of a push-in connection. This latter enables the adapter to be changed. A pivot attachment of this type enables guides to be changed rapidly between that by means of the adapter and that by means of the abutments of the through passages alone. In addition, provision and handling of the adapters is simplified, for example the selection of matching adapters for both through passages.

In an optional embodiment, the abutments (or additional abutments) are respectively formed by an inner border of an indentation in the through passages. In this regard, the width of the indentation may be selected so as to be smaller than the width of the through passage. A plurality of indentations may also be present, which each form abutments and which have a width which decreases with each additional indentation. As an example, in the case of a through passage width of 30 mm, the width of the indentation may be 25 mm and/or 15 mm. The adapters which have been described above may also have indentations of this type.

In a further optional embodiment, the accessory device with a deflector has at least four through passages, wherein a first pair of the through passages is configured to orientate the support under the printing head of an attached electronic marking device and the second pair of the through passages is configured to orientate the support in the same plane and parallel to the orientation in the first pair and under the electronic marking device, wherein the deflector for deflecting the support is arranged between the first pair and the second pair. The abutments for guiding the support to be printed in this regard are formed in the through passages. Optionally, the through passages are symmetrical with respect to the printing head and arranged on opposite sides of the marking device, wherein in particular, a first pair of opposite through passages is centred about the printing head (in the printing direction and transversely to the printing direction, centred on an imaginary line connecting a first through passage to the printing head and on to a second through passage) and a second pair of through passages is centred around the movement detector of the electronic marking device in the same manner. In this regard, the deflector is arranged between the movement of the support of the two pairs of through passages. In this regard, the guide for the first pair should run substantially transversely to the printing head, i.e., in the printing direction. In this embodiment, the guidance of the support in the second pair of through passages is parallel to the first pair. In addition, the guides may be arranged in a manner such that the subsection of the support to be printed in the first pair is located in the same plane as the subsection in the second pair. In this embodiment, it is possible to print a support in a manner such that no part of the section of the support to be printed has to be guided along under the movement detector so that it can detect the movement of the support. This task is fulfilled in this embodiment by the portion of the support which is located in the reverse feed (or reverse direction when the support is moved in the opposition direction) in the second pair of through passages. This means that it is possible to print even very narrow supports and supports with a width that is smaller than the length of the printing head over the entire surface.

In this regard, the controller for the electronic marking device may be configured such that a longitudinal component of the movement detected by the movement detector is reversed and the printing head is activated on the basis of the reversed movement in order to print onto the support. Particularly in the case of asymmetric motifs (for example with text content), the direction of movement is important as regards the printing procedure. The control may, for example, be capable of being switched, so that reversing the longitudinal component by the user can be activated and deactivated depending on the support which is used. Alternatively, the marking device may detect the use of an accessory device with deflector and automatically activate or deactivate the reversal.

BRIEF DESCRIPTION OF THE DRAWINGS

The disclosure will now be described in further detail on the basis of exemplary embodiments, to which it is not limited, and with reference to the drawings. In the drawings.

DETAILED DESCRIPTION OF THE PREFERRED EMBODIMENT

Figure 1:
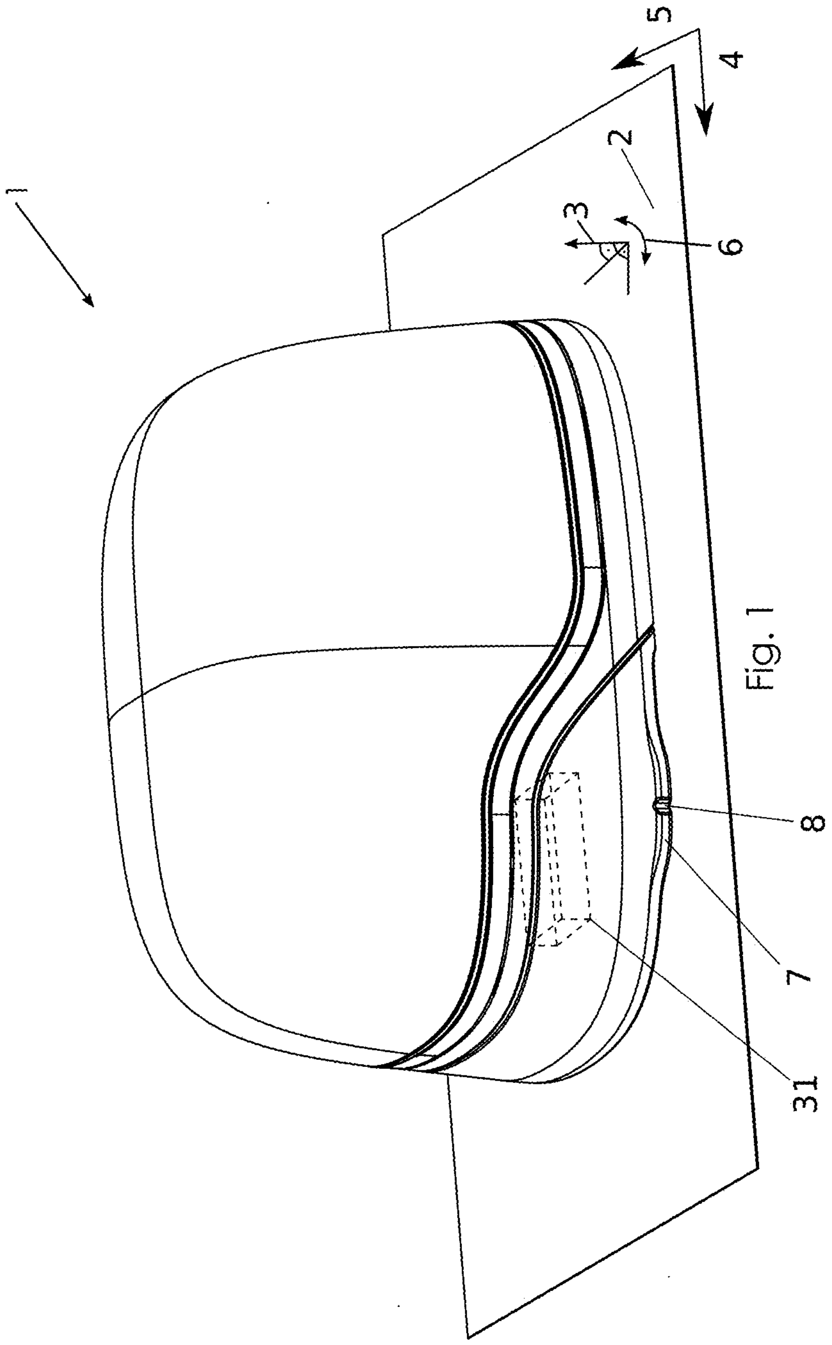
FIG. 1 schematically shows an electronic marking device which is suitable for attachment to an accessory device.

FIG. 1 schematically shows an electronic marking device 1 for use in association with an accessory device 9 (FIGS. 2 to 7). The electronic marking device 1 is located on a support 2 to be printed and can be displaced relative to it transversely to the surface normal 3 in the directions 4 and 5 and be rotated about the surface normal 3 3 in the direction 6. The system therefore has three degrees of freedom. As can be seen in FIG. 1, in the lower region, the electronic marking device 1 has a small projection 7 with a groove 8 on its side. This groove serves on the one hand to enable better orientation of the print and on the other hand, it is used to secure the electronic marking device 1 in the accessory device 9 and to prevent any movement between the electronic marking device 1 and the accessory device 9. The projection 7 and the groove 8 are located on both sides of the electronic marking device 1 and are arranged symmetrically.

Figure 2:
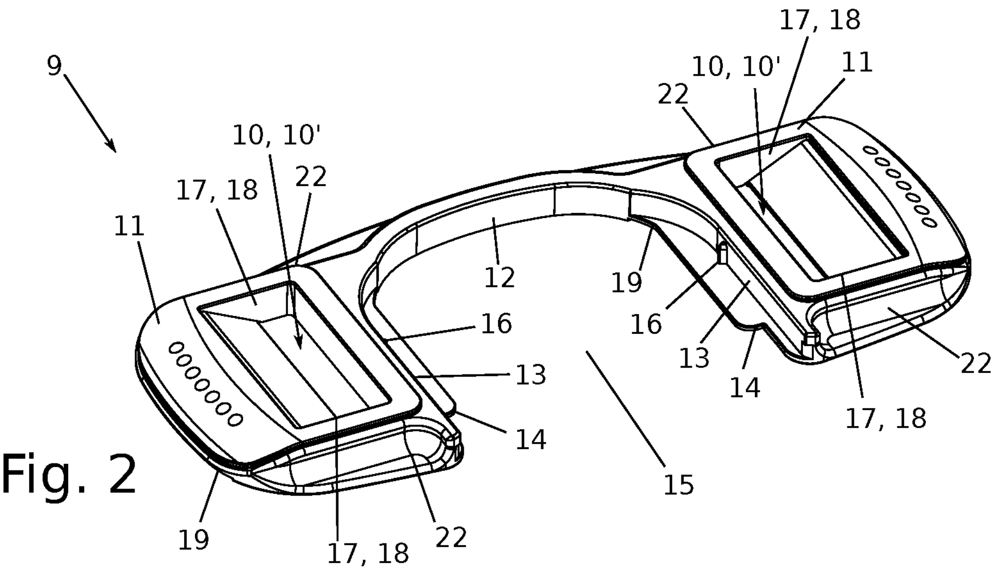
FIG. 2 schematically shows a view of an arcuate accessory device with removable adapter.

FIG. 2 schematically shows an arcuate accessory device 9 with two through passages 10 which each receive an adapter 11. In this regard, the adapters 11 can be inserted into the through passages 10 from above and removed from above. In the received condition, the adapters 11 lie on the border of the respective through passage 10. The arcuate inner border is divided into an upper inner border 12 and two lateral inner borders 13. The upper inner border 12 has the shape and dimensions of the outer border of the electronic marking device 1. The lateral inner borders 13 have a separation from each other which corresponds to the width of the electronic marking device 1 including the projections 7. The lateral inner borders 13 may also follow the shape of the outer edge of the marking device 1 including the projections 7. At the lateral inner borders 13 of the accessory device 9, a flat projection 14 is formed which prevents the electronic marking device 1 from falling through the opening in the central region 15 of the accessory device 9 formed by the frame when the marking device 1 is inserted. Furthermore, a pin 16 is located at each lateral inner border 13. These pins 16 are connected to the grooves 8 on the electronic marking device 1 upon insertion thereof. In this manner, the orientation of the marking device 1 is centrally fixed in the accessory device 9.

The adapters 11 in turn have through passages 10' through which a support to be printed which has a width that is smaller than the width of the through passages 10' of the adapters 11, for example a strip of paper, can be guided. In this regard, the abutments 17 which form the guide are formed by the insides 18 of the through passages 10' of the adapters 11. The through passages 10' in this regard are narrower than the corresponding through passages 10 in which the adapters 11 are arranged. In this regard, the support is introduced into the through passages 10' in a manner such that in the central region 15 in which the electronic marking device 1 is located, it runs under the accessory device 9 and can be printed by the printing head 31 of an attached electronic marking device 1. Such a printing head may be conventional and is well known in the art. Starting from the border of the adapters 11 with which they abut the accessory device 9, wing portions extend on both sides into the respective through passage 10. An inclined surface in the through passage 10 of the accessory device 9 remains free of the adapter 11 here. The adapters 11 have gripping surfaces which extend outwards from the through passage 10', i.e., in the direction away from the central region 15, over the border of the accessory device 9. In this manner, the adapters 11 can be removed from the through passages 10 with the aid of the gripping surfaces.

When the adapters 11 are removed from the accessory device 9, the guide is formed by the abutments 17' which in turn are formed by the insides 18' of the through passages 10 of the accessory device 9.

Figure 3B:
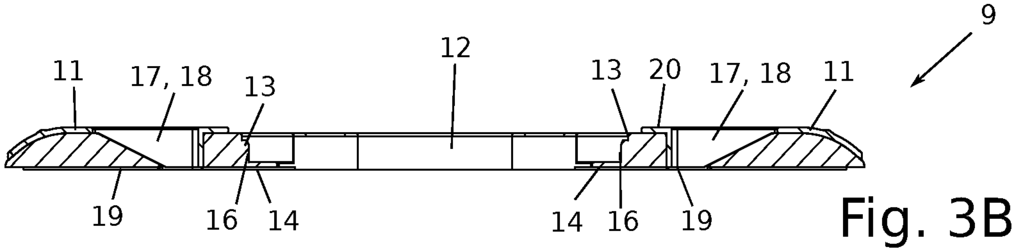
FIG. 3A schematically shows a top view of the accessory device of FIG. 2, and FIGS. 3B and 3C respectively show a section along the lines B-B or C-C in FIG. 3A.
Figure 3A:
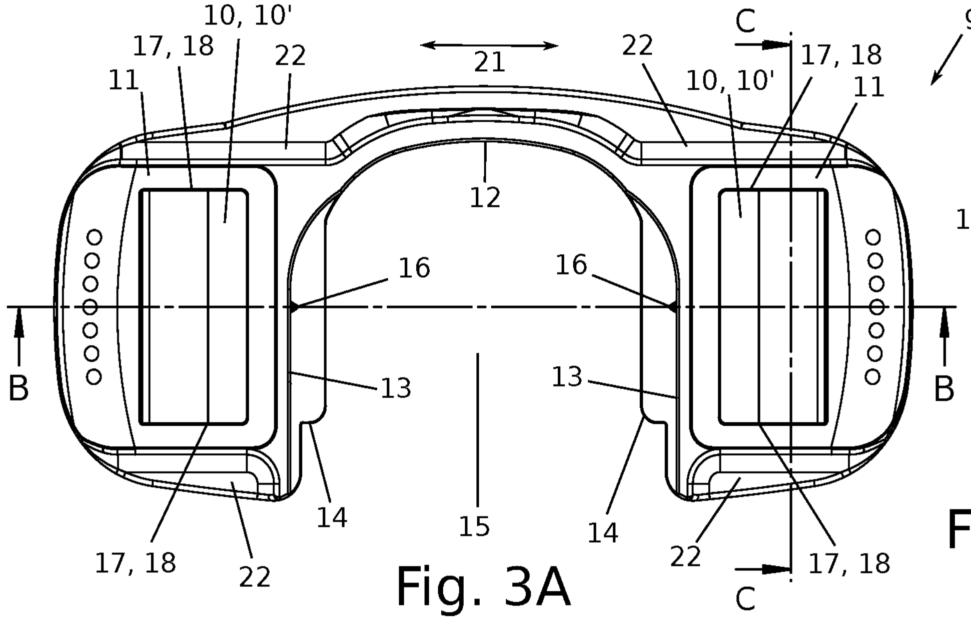
Figure 3C:
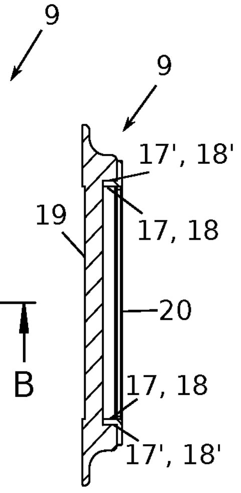
Figure 4:
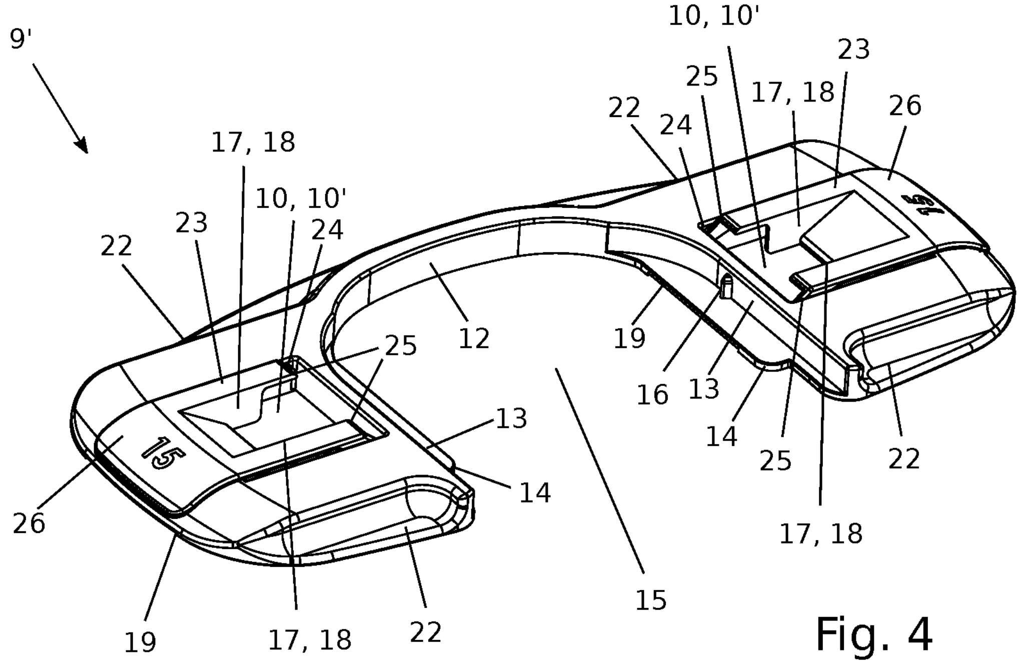
FIG. 4 schematically shows an accessory device with pivotably mounted adapters in the closed condition.
Figure 5:
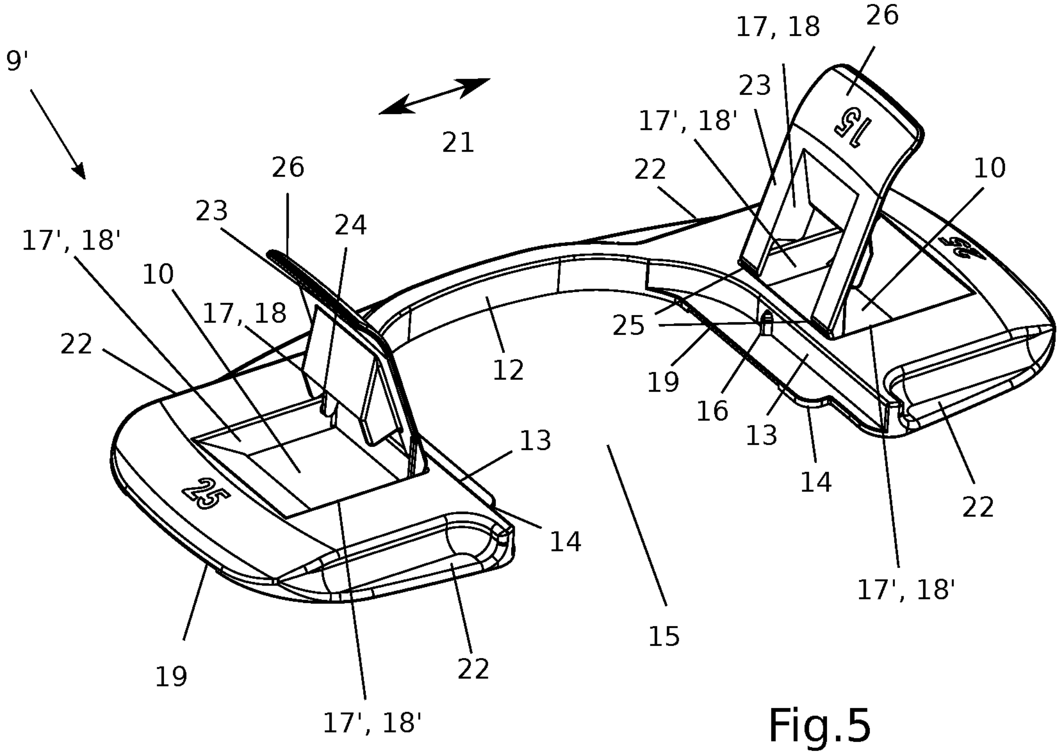
FIG. 5 schematically shows the accessory device in accordance with FIG. 4, with pivotably mounted adapters in the open condition.
Figure 6B:
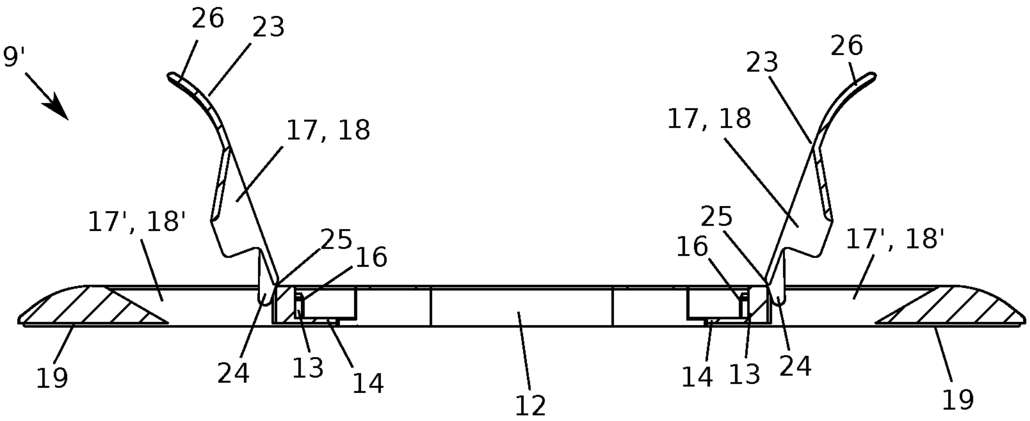
FIG. 6A schematically shows the accessory device in accordance with FIG. 5 in a top view and FIG. 6B shows a section along the line B-B in FIG. 6A.
Figure 6A:
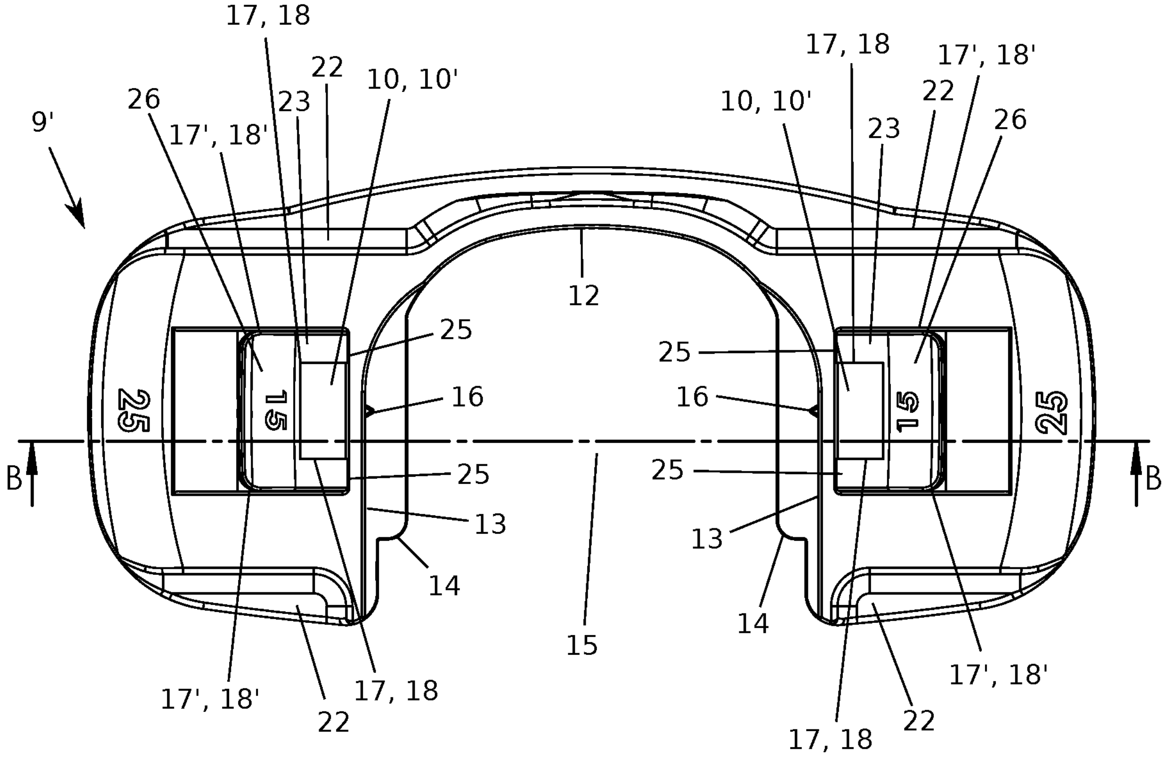

As can be seen in FIGS. 2, 3B and 3C, the underside of the accessory device 9 in the region in which a support which is guided through the through passage 10 is located has an indentation 19 in the direction of the top 20. This indentation 19 serves to prevent the support to be printed from becoming trapped when, for example, the accessory device 9 is placed on a table. This should guarantee free movement of the support in the printing direction 21. It can also be seen that the indentation 19 extends over the entire length of the accessory device 9. This means that the support to be printed can be guided through only one through passage 10' and guided out on the other side under the accessory device 9, or the support needs only to be pulled along under the accessory device 9 without guiding it through one of the through passages 10'. Correspondingly, the scope of the invention also encompasses an accessory device without through passages. In this regard, the abutments may be formed by the side borders of the indentation 19. Correspondingly, the accessory device could, for example, be a plate with a strip-shaped indentation on an underside and an opening for the printing head of an electronic marking device.

Figure 7B:
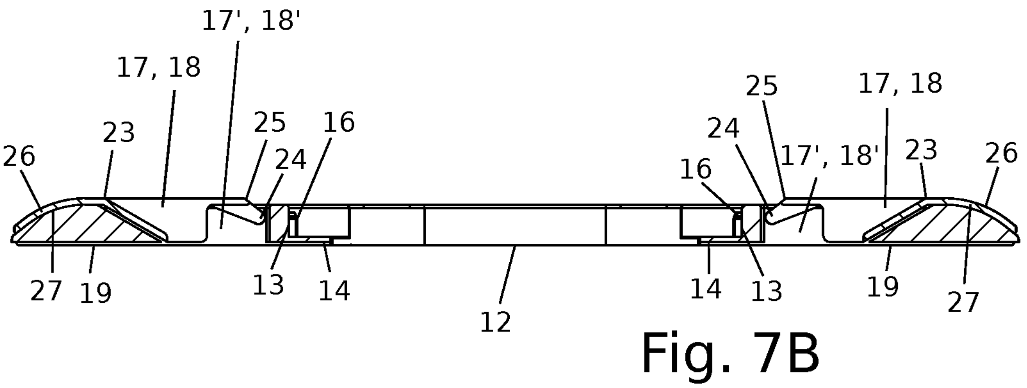
FIG. 7A schematically shows the accessory device in accordance with FIG. 4 in a top view and FIG. 7B shows a section along the line B-B in FIG. 7A.
Figure 7A:
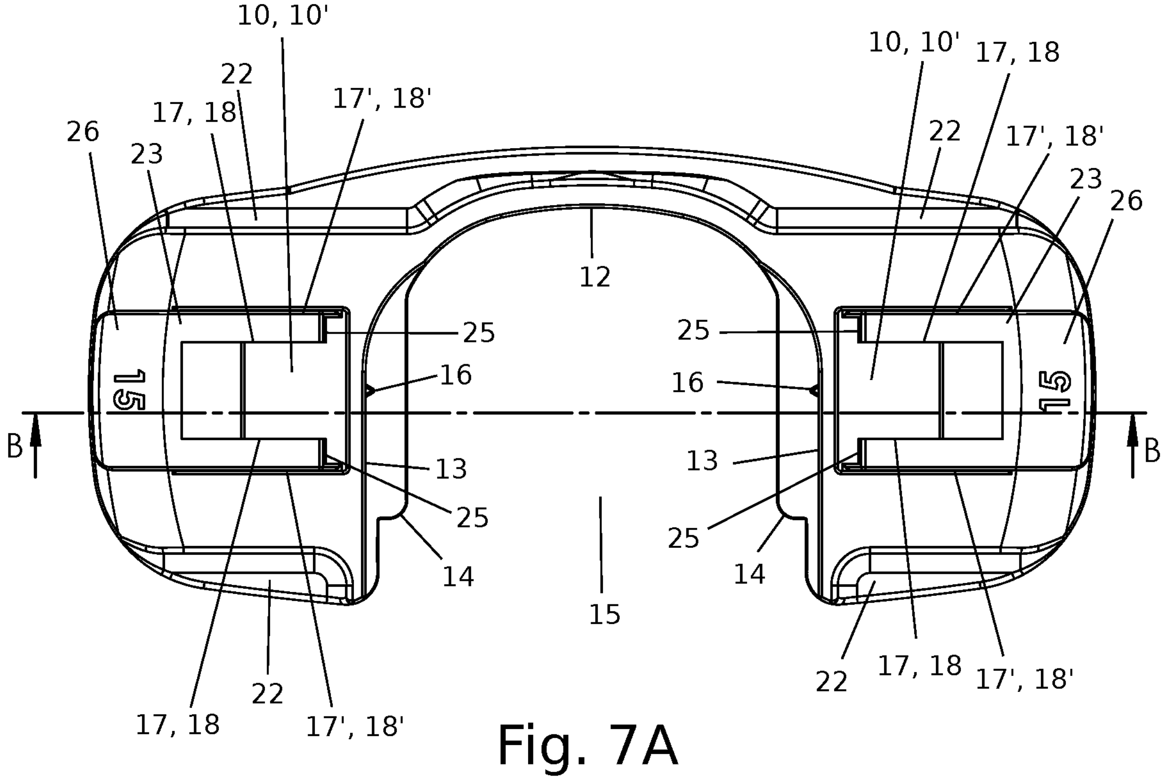

Furthermore, the accessory device 9 has two handles 22 to make it easier for a hand to grasp and hold it. FIGS. 4 to 7 show a similar accessory device 9', but in this case with pivotably mounted adapters 23. This pivotable mounting permits a rapid change between two different widths for the guide by opening or closing the adapters 23. The adapters 23 are attached to the pivot axis on the accessory device 9 via pins 24 so that the adapters 23 can be engaged in the accessory device 9 and are then pivotably mounted. The pivotably mounted adapters 23 have an abutment 25 in the vicinity of the pivot axis which limit its movement when opening. When closing, the movement is limited by a tab 26 which is radially beyond the pivot axis and forms a part of the adapter 23. As can be seen in FIG. 7B, in the closed condition, a contact 27 is formed by the aforementioned tab 26 alone, apart from the pin 24, between the adapter 23 and the accessory device 9'. In contrast to the embodiment of FIGS. 2 and 3, the adapters 23 have an inclined surface which covers the inclined surface of the through passages 10. This ensures that a support cannot be pushed under the adapter 23. For the purposes of clarity, the properties of the accessory device 9' and those of the adapter 23, which have already been described in FIGS. 2 and 3, have not been described again. Identical parts are provided with identical reference numerals. Here, only the differences between the embodiment of FIGS. 2 and 3 have been described. Reference should be made to FIGS. 2 and 3 for further details in this regard.

In order to use the accessory device, the support (for example a tape) can be pulled through the through passages and past the printing head. As an alternative, the marking device may be pulled along on the support. In addition, the marking device could also be held upside down (for example in the case of an accessory device without through passages) and the tape could be guided over the marking device.

Figure 8:
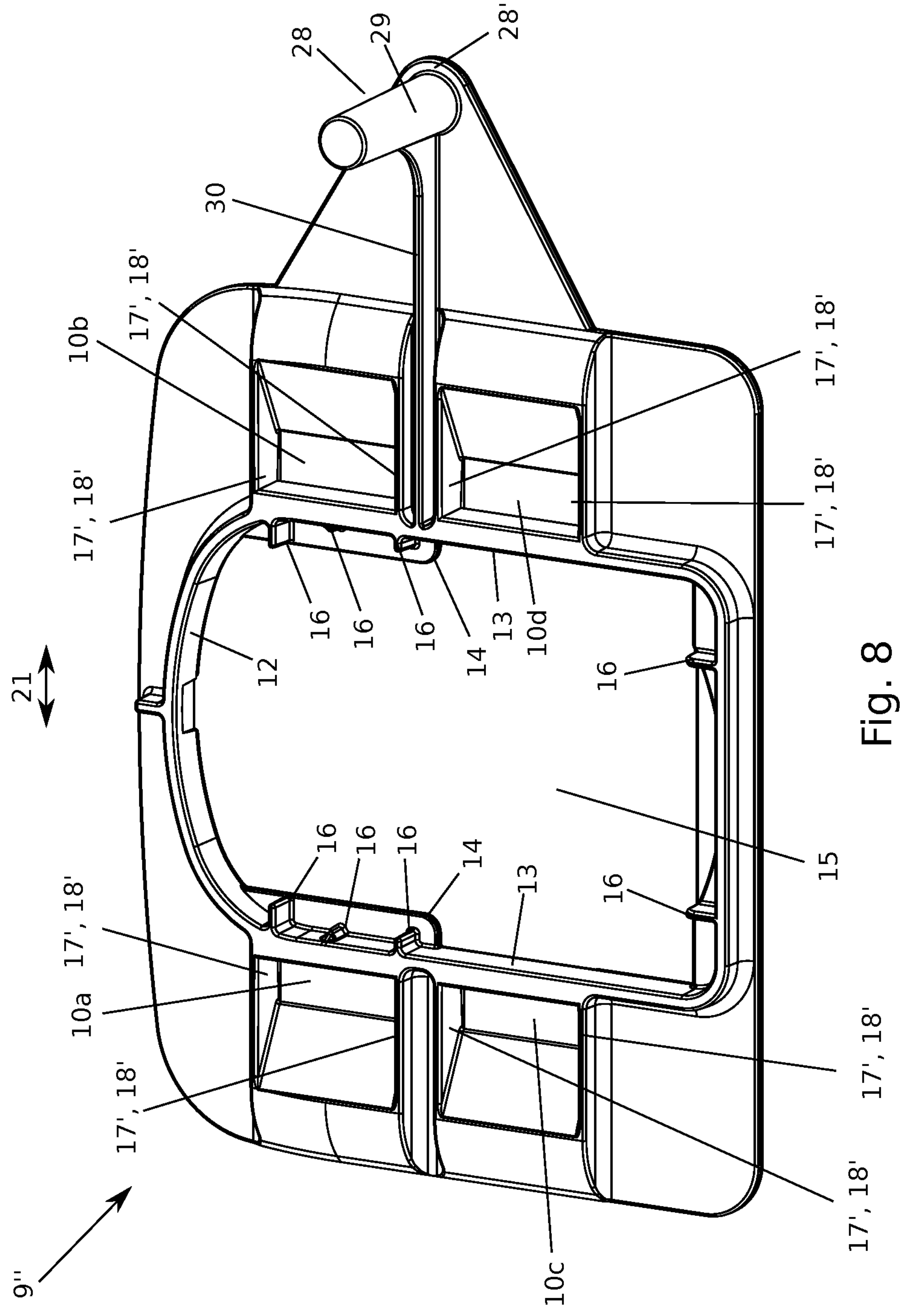
FIG. 8 schematically shows an accessory device with a deflector.

FIG. 8 shows a further embodiment of the accessory device 9" in an isometric top view which is intended for use with an electronic marking device in which a movement detector is arranged transversely offset with respect to the printing direction next to the printing head. This accessory device 9" has four through passages **10*a*-10*b* which are arranged in pairs on two sides of the accessory device 9". Two of the through passages 10*a*, 10*b* are opposite each other centred about the printing head; the other two through passages 10*c*, 10*d* are next to them, transversely offset with respect to the printing direction 21 and in this regard are substantially centrally arranged about the movement detector of the electronic marking device 1. Furthermore, the accessory device 9" has a deflector 28 in the form of a pin 29 which is located in the printing direction 21 to one side of the symmetrical portion of the base section. Here, the pin protrudes substantially normally out of a plane in which the support is guided through the through passages 10*a-d*. The cross sectional area of the pin 29 decreases in the direction away from the base section in the axial direction. This is so that when guided around the pin 29, the support does not have to be turned through a full 90°, therefore reducing the physical strain on the support. The section of the base to which the pin 29 is attached and which has a larger extent than the largest cross sectional area of the pin 29 acts as an abutment 28' for the deflector 28 and prevents the support to be printed from slipping off in the direction of the base section. Next to the base section, the pin 29 is additionally connected to the accessory device 9" via a fillet 30. The fillet 30 acts to stabilise the pin 29 during operation. Furthermore, the accessory device 9" has an opening in its central region 15 which exposes at least the printing head and the movement detector of the attached electronic marking device 1. The accessory device 9" has flat protrusions 14 to prevent the attached electronic marking device 1 from falling through. In addition, protrusions 16 are present on the accessory device which engage in associated grooves 8 of the electronic marking device 1 when attached and therefore act to provide optimal orientation thereof in the accessory device 9"**.

Figure 9:
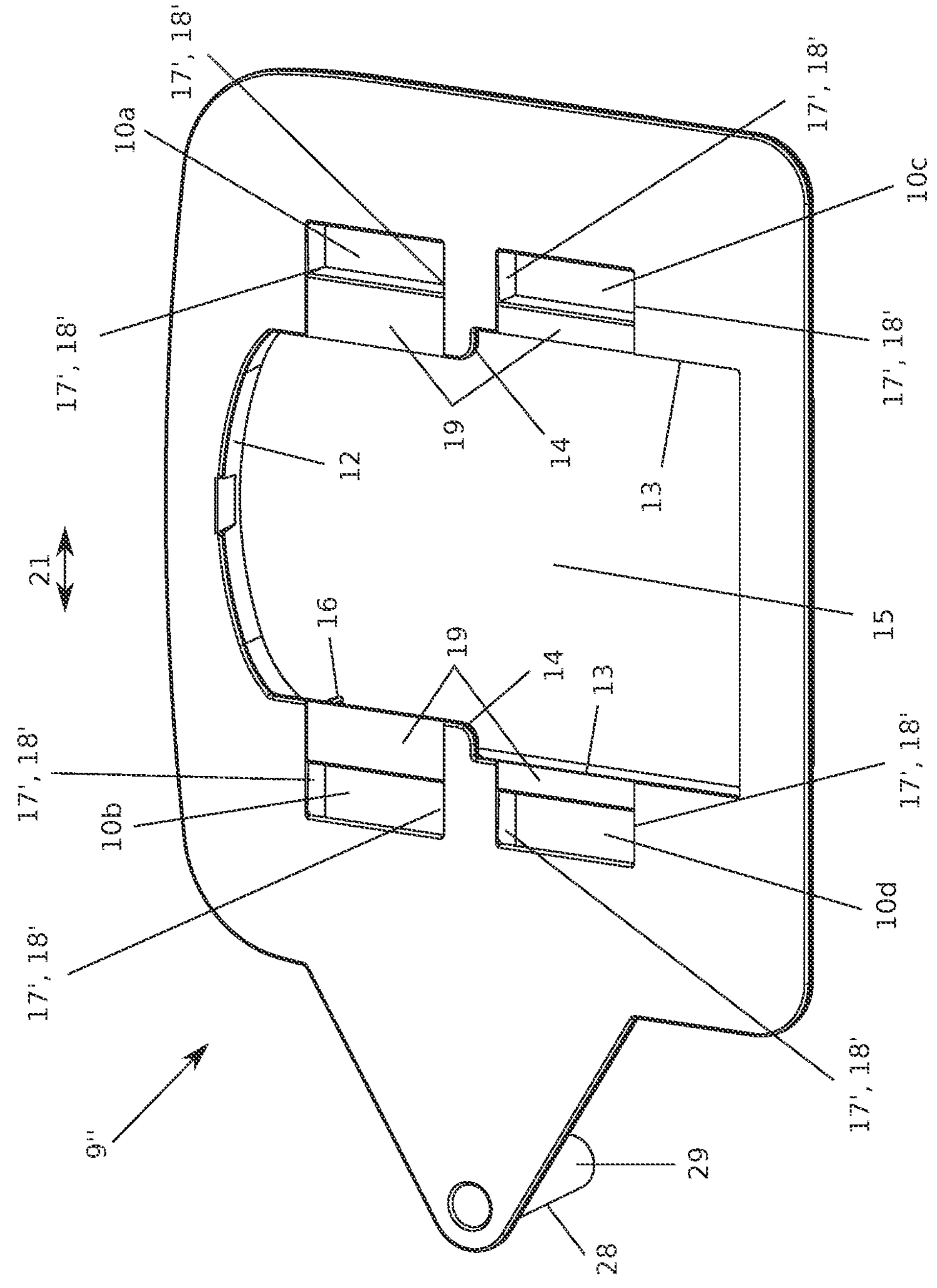
FIG. 9 shows the underside of the accessory device of FIG. 8.

FIG. 9 shows the underside of the accessory device 9". It can be seen that indentations 19 are provided on the underside between the respectively opposite through passages 10*a-d*. Like the other embodiments, these act to enable the support to be guided along the underside of the accessory device 9" without becoming trapped between the accessory device 9" and a platform on which it is placed.

In order to print a support with an electronic marking device 1 using the accessory device 9", the support is guided into one of the openings 10*a*, 10*c* from above, guided along under the device and guided up through the respectively opposite opening 10*b*, 10*d*. Afterwards, the support to be printed is turned through almost 90°, guided around the deflector 28 and then turned back through the same angle (alternatively, the support can also be turned through 90° by an appropriate deflector and then turned again through 90°). After this, it is guided once again through the respective other through passage 10*d*, 10*b* on the same side, guided along under the device 9" and finally guided out and up through the remaining through passage 10*c*, 10*a*. In operation, or more precisely during the printing procedure, tension is exerted, for example, on one of the two parts of the support leaving the accessory device 9". This moves the support between a first pair of through passages 10*a-b* in the direction of the deflector 28 and between the second pair of through passages 10*c-d* away from the deflector 28. In this regard, that portion of the support which is located between the first pair is printed and the other portion between the second pair is guided past the movement detector and acts to detect the speed of movement of the support and can control the printing head as a function of the movement. In this regard, the controller for the printing head takes into account the fact that the movement detected by the movement detector is in the opposite direction to that of the portion of the support to be printed.

The construction of the accessory device 9" of FIGS. 8 and 9 may be combined with the embodiments shown in FIGS. 1 to 7 described above.

The invention claimed is:

1. An accessory device for an electronic marking device for printing on a support, the accessory device comprising:

an attachment mechanism for releasable attachment to the electronic marking device and an opening for exposing a printing head of the electronic marking device;

a plurality of abutments, including a first abutment, a second abutment, and a third abutment for limiting a displacement of the support transversely to a direction of printing;

a deflector for deflecting the support in a direction which differs from the direction of printing, wherein the first abutment and the deflector are arranged on different sides of the opening and the direction of printing runs from the first abutment, under the opening, to the deflector; and wherein the second abutment is configured to limit the displacement of the support transversely to the direction of printing before a deflection of the support at the deflector, and the third abutment is configured to limit the displacement of the support transversely to the direction of the printing head after the deflection of the support at the deflector.

2. The accessory device as claimed in claim 1, wherein the deflector has at least one deflector abutment which limits a transverse displacement of the support with respect to the deflector.

3. The accessory device as claimed in claim 1, wherein at least some of the plurality of abutments are arranged on different sides of the opening.

4. The accessory device as claimed in claim 3, wherein the plurality of abutments are each formed in through passages of the accessory device, and wherein each of the plurality of abutments are respectively formed by an inner border of an indentation in the through passages.

5. The accessory device as claimed in claim 1, wherein the plurality of abutments are each formed in through passages of the accessory device.

6. The accessory device as claimed in claim 5, wherein all the through passages have the same width.

7. The accessory device as claimed in claim 5, wherein the plurality of abutments are each formed by an inner border of the through passages.

8. The accessory device as claimed in claim 5, wherein the plurality of abutments are each formed by the inner border of adapters which are respectively received in the through passages.

9. The accessory device as claimed in claim 8, wherein the adapters are introduced releasably into the through passages.

10. The accessory device as claimed in claim 8, wherein the adapters are pivotably mounted with respect to the through passages.

11. The accessory device as claimed in claim 5, wherein all the through passages have a width of 15 mm.

12. The accessory device as claimed in claim 5, wherein all the through passages have a width of 25 mm.

13. The accessory device as claimed in claim 5, wherein all the through passages have a width of 30 mm.

14. The accessory device as claimed in claim 5, wherein all the through passages have a width of 10 mm to 40 mm.

15. The accessory device as claimed in claim 1, wherein the plurality of abutments are each formed in through passages of the accessory device, wherein the accessory device has at least four of the through passages, wherein a first pair of the through passages is configured to orientate the support under the printing head of an attached electronic marking device and a second pair of the through passages is configured to orientate the support in a same plane and parallel to an orientation in the first pair and under the electronic marking device, wherein the deflector for deflecting the support is arranged between the first pair and the second pair.

* * * * *